Figure 1:
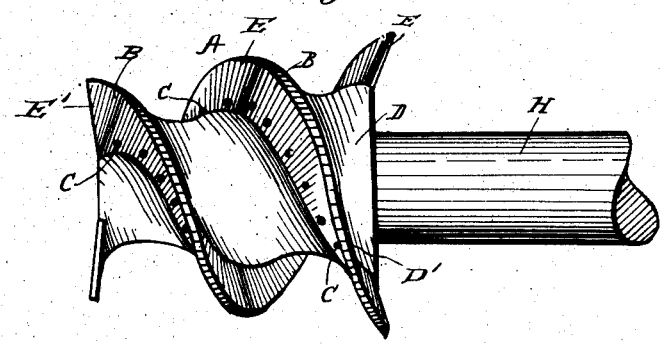

H. NEITZEL.
EXPRESSING SCREW OR AUGER FOR BRICK MACHINES.
APPLICATION FILED SEPT. 6, 1907.

901,819.  Patented Oct. 20, 1908.

Witnesses
F. J. Veihmeyer
J. E. Burner

Inventor
Herman Neitzel
By Edsen Bro's
Attorneys dd
UNITED STATES PATENT OFFICE.

HERMAN NEITZEL, OF CONCORDIA, KANSAS.

EXPRESSING SCREW OR AUGER FOR BRICK-MACHINES.

No. 901,819.  Specification of Letters Patent.  Patented Oct. 20, 1908.

Application filed September 6, 1907. Serial No. 391,748.

*To all whom it may concern:*

Be it known that I, HERMAN NEITZEL, a citizen of the United States, residing at Concordia, in the county of Cloud and State of Kansas, have invented certain new and useful Improvements in Expressing Screws or Augers for Brick-Machines; and I do hereby declare the following to be a full, clear, and exact description of the invention, such as will enable others skilled in the art to which it appertains to make and use the same.

This invention relates to improvements in expressing screws or augers used in brick machines for forcing the clay through the die. This class of augers must be very strong and durable as many tons pressure come upon them. To adapt my improved auger for all kinds of work, but more especially where stiff clay is employed, I have provided a cast iron head which is so constructed that it is very strong and durable. I have further arranged the device so that it can be removed when it becomes too much worn for practical use. This consists in having the auger head detachable from the auger stem and a recess or mortise formed within the auger head to receive the end of said auger stem which can be screwed therein, or have a conical seat with a key or feathering device for retaining the head in place.

The invention further consists in making the spiral portion of the screw of sheet steel or any desired material and bolting it to the auger head. By this means the screw or spiral can be readily replaced when it becomes worn or is otherwise rendered useless.

The invention further consists of the practical and novel construction of the auger head to receive the sheet steel screw. Said auger head is formed with a spiral step or rabbet providing a permanent and durable seat as well as a shoulder which reinforces the spiral. Said rabbet may extend any distance upon the rear portion or back of the spiral without obstructing the movement of the clay when the device is in operation, while the auger head is so constructed that its contour forms a spiral groove which is rounded or concave in cross section and has smooth uninterrupted connection with the sheet metal spiral. The general form of said auger head and spiral is conical. By this means the entrance of the auger into the clay is more easily accomplished.

This device has advantages over those in present use as it is inexpensive compared to those augers which are formed from the stock of the auger stem. With my improved device, auger heads can be kept on hand ready for immediate use in case one becomes broken through constant use or from other causes, thus preventing any undue delay for repairs.

Figure 2:
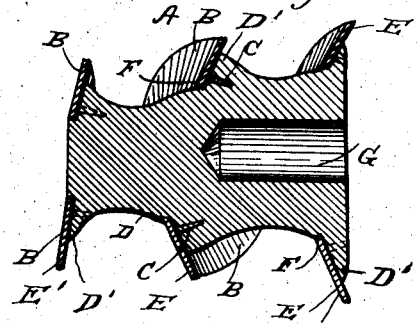
Figure 3:
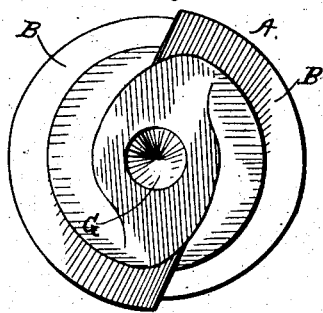

In the drawing Figure 1 is a side elevation of my improved auger. Fig. 2 is a longitudinal section of the device exhibiting the means for securing an auger stem, and Fig. 3 is a rear view of the device.

The auger head A has spiral grooves D formed therein leaving ridges $D^1$ between said grooves. Strips B of sheet steel bent to form corresponding spirals are secured in rabbet grooves F in the working faces of said ridges by means of screws or bolts C. Said strips are inclined rearward as at E except at the outer end of the head where they are inclined slightly forward at $E^1$. Said strips project beyond said ridges and constitute the working screw of the auger. The rabbeted joint between said strips and the auger head provides a smooth surface where said parts meet. The auger head is preferably tapered to its end as shown.

Centrally located in the rear end of the head A is a bore or opening G for securing the end of an auger stem H, which can be of any contour on its end for retaining the head A. By the use of the steel strips B which engage the clay, I am able to produce a brick of firm structure with less power as the clay runs over steel more smoothly and easily than over cast iron. With a cast iron auger a certain plastic clay must be used and it will not make brick out of a sandy or loamy clay. On the other hand, my auger will work in any kind of clay whether sandy, loamy or plastic.

I claim:

1. An expressing screw or auger for brick machines, having a spiral rounded groove therein, and a spiral plate secured to the working face of the ridge at the edge of said groove and inclined rearwardly in conformity to said face.

2. An expressing screw or auger, for brick machines, having a spiral rounded groove therein, and a spiral plate secured to the working face of the ridge at the edge of said groove and inclined rearwardly in conformity to said face, except at the forward end of said auger where said plate is inclined slightly forward.

3. An expressing screw or auger for brick machines having its head formed with a spiral rounded groove, and a spiral wear plate secured in a rabbet groove in the working face of the ridge at the edge of said groove, said plates projecting beyond said ridges and being inclined rearwardly in conformity to said working face.

4. An expressing screw or auger for brick machines having its head formed with a spiral rounded groove, and a spiral wear plate secured in a rabbet groove in the working face of the ridge at the edge of said groove, said plates projecting beyond said ridges and being inclined rearwardly in conformity to said working face, except at the forward end of said head where said plate is inclined slightly forward.

5. An expressing screw or auger for brick machines comprising a solid cast head having a socket in its rear end extending only part way therethrough, and a shaft secured in said socket, said head being tapered and having a plurality of spiral rounded grooves formed in its surface, and spiral wear plates secured in rabbet grooves in the working faces of the ridges at the edges of said grooves, said plates projecting beyond said ridges and being inclined rearwardly in conformity to said working faces.

6. An expressing screw or auger for brick machines comprising a solid cast head having a socket in its rear end extending only part way therethrough, and a shaft secured in said socket, said head being tapered and having a plurality of spiral rounded grooves formed in its surface, and spiral wear plates secured in rabbet grooves in the working faces of the ridges at the edges of said grooves, said plates projecting beyond said ridges and being inclined rearwardly in conformity to said working faces, except at the forward end of said head where said plates are inclined slightly forward.

In testimony whereof, I affix my signature, in presence of two witnesses.

HERMAN NEITZEL.

Witnesses:
W. F. Neitzel,
T. C. Hughes.